United States Patent [19]

Agano

[11] Patent Number: 5,151,597
[45] Date of Patent: Sep. 29, 1992

[54] METHOD FOR READING OUT RADIATION IMAGES

[75] Inventor: Toshitaka Agano, Kanagawa, Japan

[73] Assignee: Fuji Photo Film Co., Ltd., Kanagawa, Japan

[21] Appl. No.: 682,279

[22] Filed: Apr. 9, 1991

[30] Foreign Application Priority Data

Apr. 10, 1990 [JP] Japan .................. 2-94649

[51] Int. Cl.⁵ .............................................. G01N 23/04
[52] U.S. Cl. ............................... 250/327.2; 250/484.1
[58] Field of Search ........................... 250/327.2, 484.1

[56] References Cited

U.S. PATENT DOCUMENTS

| | | | |
|---|---|---|---|
| 4,258,264 | 3/1981 | Kotera et al. | 250/327.2 |
| 4,276,473 | 6/1981 | Kato et al. | 250/327.2 |
| 4,315,318 | 2/1982 | Kato et al. | 264/515 |
| 4,387,428 | 6/1983 | Ishida et al. | 364/414 |
| 4,996,542 | 2/1991 | Ohgoda et al. | 346/108 |
| 5,012,096 | 4/1991 | Takeda et al. | 250/327.2 |

FOREIGN PATENT DOCUMENTS

56-11395 2/1981 Japan .

*Primary Examiner*—Carolyn E. Fields
*Assistant Examiner*—Drew A. Dunn
*Attorney, Agent, or Firm*—Sughrue, Mion, Zinn, Macpeak & Seas

[57] ABSTRACT

A stimulable phosphor sheet, on which a radiation image has been stored, is scanned with stimulating rays in a main scanning direction and in a sub-scanning direction. The stimulating rays cause the stimulable phosphor sheet to emit light in proportion to the amount of energy stored thereon during its exposure to radiation. The light emitted by the portion of the stimulable phosphor sheet exposed to the stimulating rays is photoelectrically detected, and an image signal representing the radiation image is thereby obtained. The speed, with which a stimulable phosphor sheet is scanned with the stimulating rays in the main scanning direction, is set to be the same for a plurality of stimulable phosphor sheets. The speed, with which a stimulable phosphor sheet is scanned with the stimulating rays in the sub-scanning direction, is set to be equal to a value inherent to each of the plurality of stimulable phosphor sheets. An image signal, which has been detected from each of the plurality of stimulable phosphor sheets, is processed, and a processed image signal is thereby obtained which represents a processed image wherein the resolution, with which the picture elements in the processed image are arrayed along the sub-scanning direction, is equal to a predetermined value.

16 Claims, 2 Drawing Sheets

FIG. 2A

|  | $y_{11}$ | $y_{12}$ |  |
|---|---|---|---|
|  | $x_{11}$ | $x_{12}$ | $x_{13}$ |
|  | $x_{21}$ | $x_{22}$ | $x_{23}$ |
|  | $x_{31}$ | $x_{32}$ | $x_{33}$ |
|  | $x_{41}$ | $x_{42}$ | $x_{43}$ |
|  | $y_{21}$ | $y_{22}$ |  |

FIG. 2B

|  | $y_{11}$ | $y_{12}$ |  |
|---|---|---|---|
|  | $x_{11}$ | $x_{12}$ | $x_{13}$ |
|  | $x_{21}$ | $x_{22}$ | $x_{23}$ |
|  | $x_{31}$ | $x_{32}$ | $x_{33}$ |
|  | $x_{41}$ | $x_{42}$ | $x_{43}$ |
|  | $x_{51}$ | $x_{52}$ | $x_{53}$ |
|  | $x_{61}$ | $x_{62}$ | $x_{63}$ |
|  | $y_{21}$ | $y_{22}$ |  |

METHOD FOR READING OUT RADIATION IMAGES

BACKGROUND OF THE INVENTION

1. Field of the Invention

This invention relates to a method for reading out a radiation image wherein a stimulable phosphor sheet, on which a radiation image has been stored, is exposed to stimulating rays, which cause the stimulable phosphor sheet to emit light in proportion to the amount of energy stored thereon during its exposure to radiation, the emitted light is photoelectrically detected, and an image signal representing the radiation image is thereby obtained. This invention particularly relates to a method for reading out a radiation image wherein an image signal representing a radiation image is obtained which yields a reproduced visible image having a controlled sharpness and a controlled graininess.

2. Description of the Prior Art

When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as a human body. In this manner, a radiation image of the object is stored on the stimulable phosphor sheet. The stimulable phosphor sheet, on which the radiation image has been stored, is then scanned with stimulating rays which cause it to emit light in proportion to the amount of energy stored thereon during its exposure to the radiation. The light emitted by the stimulable phosphor sheet, upon stimulation thereof is photoelectrically detected and converted into an electric image signal. The electric image signal is then processed as desired. The processed image signal is used during the reproduction of a visible image which has good image quality and can serve as an effective tool in, particularly, the efficient and accurate diagnosis of an illness. The visible image finally obtained may be reproduced as a hard copy or may be displayed on a cathode ray tube (CRT).

In the course of reading out a radiation image from a stimulable phosphor sheet, on which the radiation image has been stored, it is desired that an image signal representing the radiation image can be obtained which yields a reproduced visible image having a controlled sharpness and a controlled graininess. For this purpose, a novel method has been proposed in, for example, Japanese Unexamined Patent Publication No. 60(1985)-125056. The proposed method comprises the steps of adjusting the speeds, with which a stimulable phosphor sheet is scanned with stimulating rays in the main scanning direction and in the sub-scanning direction.

However, in cases where a rotating polygon mirror which rotates quickly is employed as a means for scanning a stimulable phosphor sheet with stimulating rays in the main scanning direction, such that a radiation image stored on the stimulable phosphor sheet can be read out quickly, it is technically difficult for the speed, with which the stimulable phosphor sheet is scanned with the stimulating rays in the main scanning direction, to be adjusted variably. Therefore, in cases where the speed, with which a stimulable phosphor sheet is scanned with stimulating rays, is to be adjusted such that an image signal representing the radiation image can be obtained which yields a reproduced visible image having controlled image quality, it is practically advantageous that the speed, with which the stimulable phosphor sheet is scanned with the stimulating rays in the sub-scanning direction, is adjusted.

However, when the speed, with which a stimulable phosphor sheet is scanned with stimulating rays in the sub-scanning direction, is changed, the resolution, with which the image information stored on the stimulable phosphor sheet is read out, also changes inevitably. In such cases, even if image signals are detected from stimulable phosphor sheets having the same size, read-out image signals will be obtained which are made up of a series of image signal components representing different numbers of picture elements in the radiation images.

In general, in apparatuses for reproducing visible radiation images from image signals, which have been obtained by reading out radiation images from stimulable phosphor sheets, and in image filing apparatuses for filing (i.e. storing) a plurality of radiation images in the form of image signals, the number of picture elements in each reproduced visible image or in each radiation image filed in the form of an image signal is set to a predetermined value at least for images having the same size. In such cases, if the number of the picture elements represented by the image signal components of an image signal detected from a stimulable phosphor sheet varies for stimulable phosphor sheets having the same size, visible radiation images cannot be reproduced or radiation images cannot be filed in the form of image signals.

SUMMARY OF THE INVENTION

The primary object of the present invention is to provide a method for reading out a radiation image, wherein an image signal representing a radiation image is obtained which yields a reproduced visible image having a sharpness and a graininess controlled as desired, and the number of picture elements represented by the image signal components of an image signal is kept constant for stimulable phosphor sheets having the same size.

Another object of the present invention is to provide a method for reading out a radiation image, wherein image signals representing a plurality of radiation images are obtained which can be used in a single image reproducing apparatus or a single image filing apparatus.

The present invention provides a method for reading out a radiation image, wherein a stimulable phosphor sheet, on which a radiation image has been stored, is scanned with stimulating rays in a main scanning direction and in a sub-scanning direction, which stimulating rays cause the stimulable phosphor sheet to emit light in proportion to the amount of energy stored thereon during its exposure to radiation, the light emitted by the portion of the stimulable phosphor sheet exposed to the stimulating rays is photoelectrically detected, and an image signal representing the radiation image is thereby obtained, wherein the improvement comprises the steps of:

i) setting the speed, with which a stimulable phosphor sheet is scanned with said stimulating rays in the main scanning direction, to be the same for a plurality of stimulable phosphor sheets, ii) setting the speed, with which a stimulable phosphor sheet is scanned with said stimulating rays in the sub-scanning direction, to be equal to a value inherent to each of the plurality of stimulable phosphor sheets, and iii) processing an image signal, which has been detected from each of the plurality of stimulable phosphor sheets, in order to obtain a processed image signal representing a processed image wherein the resolution, with which the picture elements in said processed image are arrayed along the sub-scanning direction, is equal to a predetermined value.

The speed, with which a stimulable phosphor sheet is scanned with the stimulating ray in the sub-scanning direction, is markedly lower than the speed, with which the stimulable phosphor sheet is scanned with the stimulating rays in the main scanning direction. Therefore, it is easy for the speed, with which the stimulable phosphor sheet is scanned with the stimulating rays in the sub-scanning direction, to be adjusted variably. By changing the speed, with which the stimulable phosphor sheet is scanned with the stimulating rays in the sub-scanning direction, an image signal representing the radiation image can be obtained which yields a reproduced visible image having a controlled sharpness and a controlled graininess.

When the speed, with which the stimulable phosphor sheet is scanned with the stimulating rays in the sub-scanning direction, is changed, the resolution, with which the image information stored on the stimulable phosphor sheet is read out along the sub-scanning direction, also changes. However, with the method for reading out a radiation image in accordance with the present invention, an image signal, which has been detected from a stimulable phosphor sheet, is processed such that a processed image signal may be obtained which represents a processed image wherein the resolution, with which the picture elements in the processed image are arrayed along the sub-scanning direction, is equal to a predetermined value. Therefore, the number of the picture elements in a processed image can be kept equal for stimulable phosphor sheets having the same size.

The resolution, with which the picture elements in the processed image are arrayed along the sub-scanning direction, cannot be set to be higher than the resolution, with which the image information stored on the stimulable phosphor sheet is read out. Therefore, the speed, with which the stimulable phosphor sheet is scanned with the stimulating rays in the sub-scanning direction, is set such that, even if it is largest, the image information stored on the stimulable phosphor sheet may be read out with a resolution higher than a predetermined value. The image signal thus detected is then processed such that a processed image signal may be obtained which represents a processed image wherein the resolution, with which the picture elements in the processed image are arrayed along the sub-scanning direction, is lower than the resolution, with which the image information stored on the stimulable phosphor sheet was read out.

With the method for reading out a radiation image in accordance with the present invention, the speed, with which a stimulable phosphor sheet is scanned with the stimulating rays in the main scanning direction, is set to be the same for a plurality of stimulable phosphor sheets. Also, the speed, with which a stimulable phosphor sheet is scanned with the stimulating rays in the sub-scanning direction, is set to be equal to a value inherent to each of the plurality of stimulable phosphor sheets. Therefore, the image quality of the reproduced visible image can be controlled as desired. Such effects can be obtained even if a means for scanning a stimulable phosphor sheet with stimulating rays in the main scanning direction, such as a rotating polygon mirror, is employed, wherein it is technically difficult for the speed, with which a stimulable phosphor sheet is scanned with the stimulating rays in the main scanning direction, to be adjusted variably.

Also, with the method for reading out a radiation image in accordance with the present invention, an image signal, which has been detected from each of the plurality of stimulable phosphor sheets, is then processed, and a processed image signal is thereby obtained which represents a processed image wherein the resolution, with which the picture elements in the processed image are arrayed along the sub-scanning direction, is equal to a predetermined value. Therefore, regardless of how the image quality of the reproduced visible image is controlled, the number of picture elements represented by the image signal components of the processed image signal can be kept constant for stimulable phosphor sheets having the same size. Accordingly, a plurality of processed image signals thus obtained can be used in a single image reproducing apparatus or a single image filing apparatus.

BRIEF DESCRIPTION OF THE DRAWINGS

FIGS. 2A and 2B are explanatory views showing how an image signal is processed and a processed image signal is obtained which represents a processed image wherein the resolution, with which the picture elements in the processed image are arrayed along the sub-scanning direction, is equal to a predetermined value.

DESCRIPTION OF THE PREFERRED EMBODIMENTS

Figure 1:
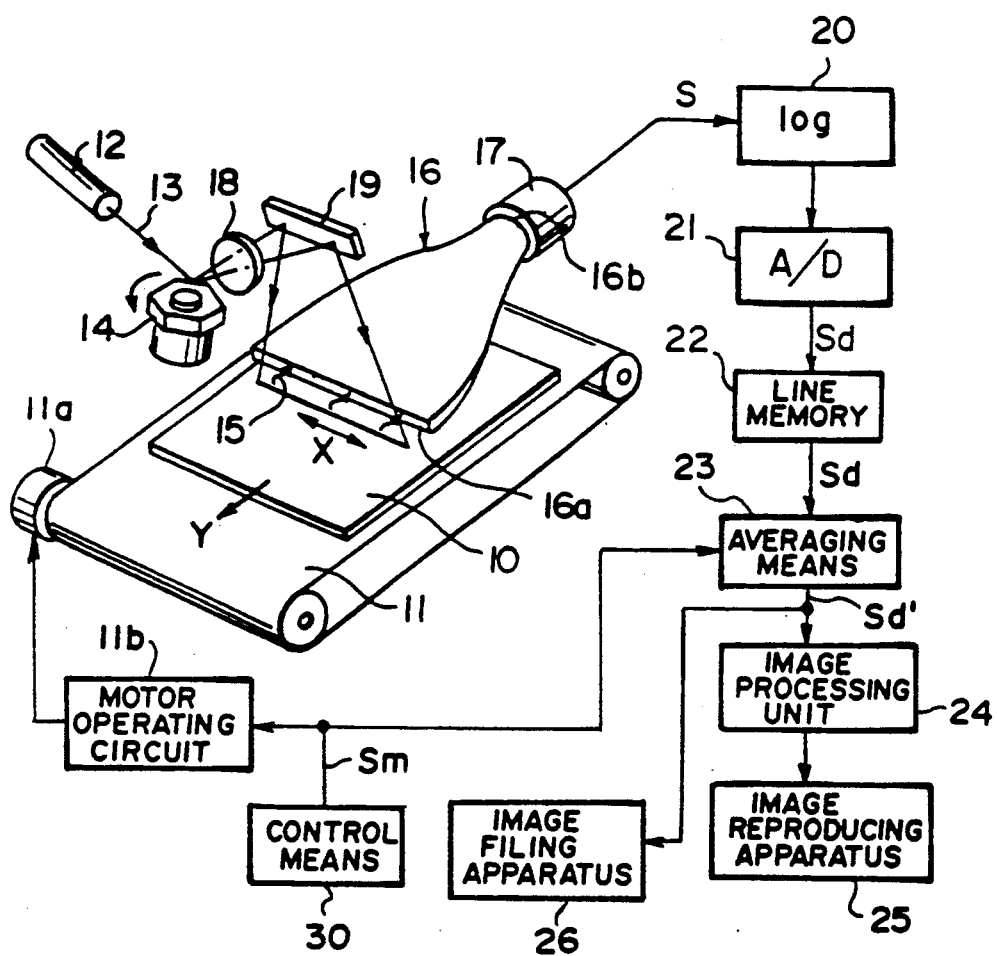
FIG. 1 is a schematic view showing an example of a radiation image read-out apparatus for carrying out an embodiment of the method for reading out a radiation image in accordance with the present invention.

The present invention will hereinbelow be described in further detail with reference to the accompanying drawings.

FIG. 1 is a schematic view showing an example of a radiation image read-out apparatus for carrying out an embodiment of the method for reading out a radiation image in accordance with the present invention.

With reference to FIG. 1, a stimulable phosphor sheet 10 has been exposed to radiation, such as X-rays, which has passed through an object. A radiation image of the object has thereby been stored o the stimulable phosphor sheet 10. The stimulable phosphor sheet 10, on which the radiation image has been stored, is then conveyed in a sub-scanning direction indicated by the arrow Y by a sheet conveyance means 11. The sheet conveyance means 11 may be constituted of an endless belt, or the like. A laser beam 13, which serves as stimulating rays, is produced by a laser beam source 12, and is deflected by a rotating polygon mirror 14 which is rotated quickly. The laser beam 13 is then converged by a converging lens 18, which is ordinarily constituted of an f$\theta$ lens. Thereafter, the laser beam 13 is reflected by a mirror 19, and is caused to scan the stimulable phosphor sheet 10 in main scanning directions indicated by the double headed arrow X, which directions are approximately normal to the sub-scanning direction indicated by the arrow Y.

When the stimulable phosphor sheet 10 is exposed to the laser beam 13, the exposed portion of the stimulable phosphor sheet 10 emits light 15 in an amount proportional to the amount of energy stored thereon during its exposure to the radiation. The emitted light 15 is guided by a light guide member 16 and photoelectrically detected by a photomultiplier 17, which serves as a photodetector. The light guide member 16 is made from a light guiding material such as an acrylic plate and has a linear light input face 16a, positioned so that it extends along the main scanning line on the stimulable phosphor sheet 10, and a ring-shaped light output face 16b, positioned so that it is in close contact with a light receiving face of the photomultiplier 17. The emitted light 15, which has entered the light guide member 16 at its light input face 16a, is guided through repeated total reflection inside of the light guide member 16, emanates from the light output face 16b, and is received by the photomultiplier 17. In this manner, the amount of the emitted light 15, which amount represents the radiation image, is converted into an electric signal by the photomultiplier 17.

In the manner described above, an analog output signal (image signal) S is generated by the photomultiplier 17. The analog output signal S is amplified by a logarithmic amplifier 20 and is then digitized into a digital image signal Sd with a predetermined scale factor in an A/D converter 21. The digital image signal Sd thus obtained is sequentially stored in a line memory 22, which is capable of storing, for example, the image signal components of the digital image signal Sd representing the picture elements in the radiation image located along several main scanning lines. The digital image signal Sd is then read from the line memory 22 in units of the image signal components representing the picture elements in the radiation image located along a predetermined number of the main scanning lines and fed into an averaging means 23.

The averaging means 23 carries out an averaging process on the image signal Sd in the manner described later, and a digital image signal Sd' is thereby obtained from the averaging process. The digital image signal Sd' is fed into an image processing unit 24, which carries out image processing, such as gradation processing and frequency response processing, on the digital image signal Sd'. The image signal Sd' obtained from the image processing is fed into an image reproducing apparatus 25, which may be constituted of a CRT display device, a light beam scanning and recording apparatus, or the like. In the image reproducing apparatus 25, the image represented by the image signal Sd', i.e. the radiation image which was stored on the stimulable phosphor sheet 10, is reproduced as visible image from the image signal Sd'.

How the image quality of the reproduced visible image is controlled and how the averaging means 23 processes the image signal Sd will be described hereinbelow. In this embodiment, by way of example, a radiation image is read out from a stimulable phosphor sheet 10 whose effective read-out region has a size of 352 mm $\times$ 352 mm.

The speed, with which the stimulable phosphor sheet 10 is scanned with the laser beam 13 in the main scanning direction, the laser beam 13 being deflected by the rotating polygon mirror 14, is kept constant regardless of the image quality required in the reproduced visible image. In this embodiment, the main scanning frequency is set to 180 Hz, and the sampling period in the A/D converter 21 is set to 1.1 sec. Also, resolution, with which the image information stored on the stimulable phosphor sheet 10 is read out along the main scanning direction, is set to 10 pixels/mm.

The sheet conveyance means 11 is moved by a motor 11a, which is operated by a motor operating circuit 11b. The motor operating circuit 11b receives a sub-scanning speed instructing signal Sm from a control means 30. The rotation speed of the motor 11a, i.e. speed, with which the stimulable phosphor sheet 10 is scanned with the laser beam 13 in the sub-scanning direction, is changed in accordance with the sub-scanning speed instructing signal Sm. In this embodiment, by way of example, the speed, with which the stimulable phosphor sheet 10 is scanned with the laser beam 13 in the sub-scanning direction, is selected from 18.0 mm/sec., 9.0 mm/sec., and 6.0 mm/sec. When the speed, with which the stimulable phosphor sheet 10 is scanned with the laser beam 13 in the sub-scanning direction, is set to 18.0 mm/sec., 9.0 mm/sec., or 6.0 mm/sec., the stimulation energy of the laser beam 13 per unit area of the stimulable phosphor sheet 10 becomes, for example, 1.63 $J/m^2$, 3.26 $J/m^2$, or 4.90 $J/m^2$. Also, the resolution, with which the image information stored on the stimulable phosphor sheet 10 is read out along the sub-scanning direction, becomes 10 pixels/mm, 20 pixels/mm, or 30 pixels/mm.

In cases where the speed, with which the stimulable phosphor sheet 10 is scanned with the laser beam 13 in the sub-scanning direction, is set to be high, and the stimulation energy of the laser beam 13 per unit area of the stimulable phosphor sheet 10 is thereby set to be low an image signal representing the radiation image can be obtained which yields a reproduced visible image having a high sharpness. In cases where the speed, with which the stimulable phosphor sheet 10 is scanned with the laser beam 13 in the sub-scanning direction, is set to be low, and the stimulation energy of the laser beam 13 per unit area of the stimulable phosphor sheet 10 is thereby set to be high, an image signal representing the radiation image can be obtained which yields a reproduced visible image having a high graininess. In this manner, an image signal representing the radiation image can be obtained which yields a reproduced visible image having a required level of image quality.

The sub-scanning speed instructing signal Sm is also fed into the averaging means 23. In cases where the speed, with which the stimulable phosphor sheet 10 is scanned with the laser beam 13 in the sub-scanning direction and which is represented by the sub-scanning speed instructing signal Sm, is highest, i.e. is 18.0 mm/sec., the averaging means 23 feeds out the digital image signal Sd directly as the image signal Sd'.

In cases where the speed, with which the stimulable phosphor sheet 10 is scanned with the laser beam 13 in the sub-scanning direction and which is represented by the sub-scanning speed instructing signal Sm, is one half of the highest value, i.e. is 9.0 mm/sec., the averaging means 23 calculates the mean value of the values of the two image signal components of the digital image signal Sd representing two picture elements in the radiation image, which picture elements are adjacent to each other with respect to the sub-scanning direction. The mean value thus calculated is employed as the value of a single image signal component of the image signal Sd' representing a single picture element. The averaging means 23 carries out the averaging process on all of the image signal components of the digital image signal Sd. Specifically, as illustrated in FIG. 2A, the image signal components of the digital image signal Sd representing two picture elements in the radiation image, which picture elements are adjacent to each other with respect to the sub-scanning direction, are represented by $x_{11}$ and $x_{21}$, $x_{12}$ and $x_{22}$, and so on. In such cases, the averaging means 23 carries out calculations, for example, with the formulas $$y_{11} = (x_{11} + x_{21})/2$$
$$y_{12} = (x_{12} + x_{22})/2$$
$$\vdots$$
$$y_{21} = (x_{31} + x_{41})/2$$
$$y_{22} = (x_{32} + x_{42})/2$$
$$\vdots$$

From the calculations, new image signal components $y_{11}, y_{12}, y_{13}, \ldots$ are obtained. In this manner, the image signal Sd', which is made up of a series of the new image signal components $y_{11}, y_{12}, y_{13}, \ldots$, and which represents a processed image, is obtained from the averaging processing. The resolution, with which the picture elements in the processed image represented by the image signal Sd' are arrayed along the sub-scanning direction, becomes equal to one half of the resolution (20 pixels/mm) in the radiation image represented by the image signal Sd, i.e. becomes equal to 10 pixels/mm. The resolution of 10 pixels/mm is equal to the resolution obtained when the speed, with which the stimulable phosphor sheet 10 is scanned with the laser beam 13 in the sub-scanning direction, is set to 18.0 mm/sec.

In cases where the speed, with which the stimulable phosphor sheet 10 is scanned with the laser beam 13 in the sub-scanning direction and which is represented by the sub-scanning speed instructing signal Sm, is one-third of the highest value, i.e. is 6.0 mm/sec., the averaging means 23 calculates the mean value of the values of the three image signal components of the digital image signal Sd representing three picture elements in the radiation image, which picture elements are adjacent to each other with respect to the sub-scanning direction. The mean value thus calculated is employed as the value of a single image signal component of the image signal Sd' representing a single picture element. The averaging means 23 carries out the averaging process on all of the image signal components of the digital image signal Sd. Specifically, as illustrated in FIG. 2B, the image signal components of the digital image signal Sd representing three picture elements in the radiation image, which picture elements are adjacent to each other with respect to the sub-scanning direction, are represented by $x_{11}, x_{21}$, and $x_{31}$; $x_{12}, x_{22}$, and $x_{32}$; and so on. In such cases, the averaging means 23 carries out calculates, for example, with the formulas $$y_{11} = (x_{11} + x_{21} + x_{31})/3$$
$$y_{12} = (x_{12} + x_{22} + x_{32})/3$$
$$\vdots$$
$$y_{21} = (x_{41} + x_{51} + x_{61})/3$$
$$y_{22} = (x_{42} + x_{52} + x_{62})/3$$
$$\vdots$$

From the calculations, new image signal components $y_{11}, y_{12}, y_{13}, \ldots$ are obtained. In this manner, the image signal Sd', which is made up of a series of the new image signal components $y_{11}, y_{12}, y_{13}, \ldots$, and which represents a processed image, is obtained from the averaging processing. The resolution, with which the picture elements in the processed image represented by the image signal Sd' are arrayed along the sub-scanning direction, becomes equal to one-third of the resolution (30 pixels/mm) in the radiation image represented by the image signal Sd, i.e. becomes equal to 10 pixels/mm. The resolution of 10 pixels/mm is equal to the resolution obtained when the speed, with which the stimulable phosphor sheet 10 is scanned with the laser beam 13 in the sub-scanning direction, is set to 18.0 mm/sec.

The averaging process is carried out in the manner described above. Therefore, even if the speed, with which a stimulable phosphor sheet is scanned with the laser beam 13 in the sub-scanning direction, varies for different stimulable phosphor sheets 10, 10, ... having the same size of 352 mm × 352 mm, the resolution, with which the picture elements in a processed image represented by each image signal Sd' are arrayed along the sub-scanning direction, can be kept at 10 pixels/mm for all of the image signals Sd', Sd', ... obtained from such stimulable phosphor sheets 10, 10, ... Also, the resolution, with which the picture elements in a processed image represented by each image signal Sd' are arrayed along the main scanning direction, is kept at 10 pixels/mm for all of the image signals Sd', Sd', ... obtained from such stimulable phosphor sheets 10, 10. Therefore, the number of the picture elements in a processed image represented by each image signal Sd', which picture elements are arrayed along the main scanning direction and the sub scanning direction, becomes equal to 3,520 × 3,520 for all of the image signals Sd', Sd', ... obtained from a plurality of the stimulable phosphor sheets 10, 10 ... having the same size of 352 mm × 352 mm.

The image signals Sd', Sd', ... representing the processed images having the same number of the picture elements can be fed into a single image processing apparatus 25 and used in the course of reproducing visible radiation images. The image signals Sd', Sd', ... representing the processed images having the same number of the picture elements can also be fed into a single image filing apparatus 26 and stored on a storage medium, such as an optical disk or a magnetic disk.

In the method for reading out a radiation image in accordance with the present invention, no limitation is imposed on the size of the stimulable phosphor sheet 10, the resolution, with which the image information stored on the stimulable phosphor sheet 10 is read out, and the predetermined value representing the resolution, with which the picture elements in the processed image are arrayed along the sub-scanning direction. For example, the resolution, with which the image information stored on the stimulable phosphor sheet 10 is read out, may be set to any of values which are not lower than the resolution, with which the picture elements in the processed image are required to be arrayed.

In the embodiment described above, the resolution, with which the picture elements in the processed image are arrayed along the sub-scanning direction, and the resolution, with which the picture elements in the processed image are arrayed along the main scanning direction, are adjusted as being equal to each other. However, they may be adjusted as being different from each other.

I claim:

1. A method for reading out a radiation image, wherein a stimulable phosphor sheet, on which a radiation image has been stored, is scanned with stimulating rays in a main scanning direction and in a sub-scanning direction, the stimulating rays cause the stimulable phosphor sheet to emit light in proportion to the amount of energy stored thereon during its exposure to radiation, the light emitted by a portion of the stimulable phosphor sheet exposed to the stimulating rays is photoelectrically detected, and an image signal representing the radiation image is thereby obtained, wherein the improvement comprises the steps of:
  i) setting a main-scan speed, with which a stimulable phosphor sheet is scanned with said stimulating rays in the main scanning direction, to be the same for a plurality of stimulable phosphor sheets,
  ii) setting a sub-scan speed, with which a stimulable phosphor sheet is scanned with said stimulating rays in the sub-scanning direction, to be equal to a value inherent to each of the plurality of stimulable phosphor sheets, and
  iii) processing the image signal, which has been detected from each of the plurality of stimulable phosphor sheets, to obtain a processed image signal representing a processed image wherein resolution, with which picture elements in said processed image for each of the plurality of stimulable phosphor sheets are arrayed along the sub-scanning direction, is equal to a predetermined value, even through the speeds with which the plurality of stimulable phosphor sheets are scanned in the sub-scanning direction varies.

2. A method as defined in claim 1 wherein said processed image signal is obtained by calculating a mean value of the values of image signal components of the image signal representing a plurality of picture elements in the radiation image stored on each of the plurality of stimulable phosphor sheets, which picture elements are adjacent to each other with respect to the sub-scanning direction, carrying out the calculation on every set of several said picture elements in the radiation image stored on each of the plurality of stimulable phosphor sheets, and employing each of the mean values thus calculated as the value of a single image signal component of said processed image signal representing a single picture element.

3. A method as defined in claim 1 wherein said radiation image is an X-ray image.

4. A method as defined in claim 1 wherein said stimulating rays are a laser beam.

5. A radiation read-out apparatus for reading out a radiation image from a stimulable phosphor sheet, said apparatus comprising:
  a scanner which scans the stimulable phosphor sheet in a main scanning direction with a beam;
  a conveyor for conveying the stimulable phosphor sheet in a sub-scanning direction at a sub-scan speed;
  a speed selection circuit, coupled to said conveyor, which sets the sub-scan speed;
  a photodetector which receives emitted light from the stimulable phosphor sheet;
  a converter, coupled to said photodetector, for converting the emitted light into a digital image signal;
  an averaging means, coupled to said converter, which averages the digital image signal with at least one adjacent digital image signal to produce an average digital image signal if the sub-scan speed is below a predetermined value; and
  an image processing circuit, coupled to said averaging means, which performs image processing on one of the digital image signal and the average digital image signal to produce a processed image.

6. An apparatus as defined in claim 5, wherein said averaging means averages the digital image signals such that the processed image for a plurality of stimulable phosphor sheets has a predetermined resolution.

7. A radiation read-out apparatus for reading out a radiation image from a stimulable phosphor sheet, said apparatus comprising:
  scanning means for scanning the stimulable phosphor sheet in a main scanning direction;
  reception means for receiving emitted light from the stimulable phosphor sheet in response to the scanning by said scanning means;
  conversion means for converting the emitted light into an image signal;
  control means for producing a sub-scanning speed instruction signal;
  sub-scan movement means for conveying the stimulable phosphor sheet in a sub-scanning direction at a sub-scan speed in accordance with the sub-scanning speed instruction signal;
  averaging means for averaging the image signal with at least one adjacent image signal to produce an average image signal if the sub-scan speed is below a predetermined value; and
  image processing means for carrying out image processing on one of the image signal and the average image signal to produce a processed image.

8. An apparatus as defined in claim 7, wherein the resolution of the processed image is predetermined.

9. An apparatus as defined in claim 7, wherein said apparatus produces processed images for a plurality of stimulable phosphor sheets, each of the processed images having a number of picture elements, and
  wherein the number of picture elements in each of the processed images is maintained constant for stimulable phosphor sheets having the same size.

10. An apparatus as defined in claim 9, wherein the number of picture elements of each of the processed images arrayed along the sub-scanning direction is equal to a predetermined number.

11. An apparatus as defined in claim 9, wherein the resolution of the each of the processed images is equal to a predetermined resolution.

12. A method for reading out a radiation image from a stimulable phosphor sheet, said method comprising the steps of:
   (a) scanning the stimulable phosphor sheet in a main scanning direction;
   (b) receiving emitted light from the stimulable phosphor sheet in response to said scanning;
   (c) converting the emitted light into an image signal;
   (d) conveying the stimulable phosphor sheet in a sub-scanning direction at a sub-scan speed;
   (e) averaging the image signal with at least one adjacent image signal to produce an average image signal if the sub-scan speed is below a predetermined value; and
   (f) carrying out image processing on one of the image signal and the average image signal to produce a processed image.

13. A method as defined in claim 12, wherein step (f) carries out the image processing on the average image signal if produced in step (e), instead of the image signal.

14. A method as defined in claim 13, wherein said method processes a plurality of stimulable phosphor sheets, and
   wherein step (f) produces processed images for said plurality of stimulable phosphor sheets, each of the processed images having a number of picture elements.

15. A method as defined in claim 14, wherein step (f) maintains the number of picture elements in each of the processed images at a constant for stimulable phosphor sheets having the said size.

16. A method as defined in claim 14, wherein the resolution of the each of the processed images produced in step (f) is equal to a predetermined resolution.

* * * * *